United States Patent [19]
Liul

[11] Patent Number: 5,329,723
[45] Date of Patent: Jul. 19, 1994

[54] RAT AND WILD ANIMAL CATCHER

[76] Inventor: Chia P. Liul, No. 170-3, Hsinyi Road, Luchou Village, Taipei County, Taiwan

[21] Appl. No.: 127,360
[22] Filed: Sep. 28, 1993
[51] Int. Cl.$^5$ .......................................... A01M 23/18
[52] U.S. Cl. .............................................. 43/61
[58] Field of Search ........................... 43/60, 61, 62

[56] References Cited

U.S. PATENT DOCUMENTS

| | | | |
|---|---|---|---|
| 363,536 | 5/1887 | Oliver | 43/61 |
| 1,453,796 | 5/1923 | Hovell | 43/61 |
| 1,765,081 | 6/1930 | Lee | 43/61 |
| 2,616,210 | 11/1952 | Reeb | 43/61 |
| 3,348,331 | 10/1967 | Williams | 43/61 |
| 4,162,588 | 7/1979 | Wyant | 43/61 |
| 4,546,568 | 10/1985 | Seyler | 43/62 |
| 4,583,316 | 4/1986 | Holtgrefe | 43/61 |
| 4,899,484 | 2/1990 | Morin | 43/61 |

Primary Examiner—Kurt C. Rowan
Attorney, Agent, or Firm—Morton J. Rosenberg; David I. Klein

[57] ABSTRACT

A rat and wild animal catcher mainly comprise a cage having two lateral open ends each having a gate the top edge of which pivotly connects to the top grid of the cage and the bottom edge of which extends outward and downward toward the bottom grid of the cage. A step member inside the cage is pivotly connected to the bottom grid of the cage such that when a rat or wild animal enters the cage and touches the step member, the step member is subjected to a downward force and causes the up lifted gates to fall down at the same time and close the open ends of the cage to prevent the caught rat or wild animal from coming out of the cage.

2 Claims, 5 Drawing Sheets 5,329,723

RAT AND WILD ANIMAL CATCHER

BACKGROUND OF THE INVENTION

To capture rats, people usually use a spring clamp plate which is positioned at where rats often pass by, such as foot of walls, corners, or shadowed places. To use the spring clamp plate, a spring clamp thereon must first be pulled open and fixed in place so that it can be actuated to spring back and catch the rat when a rat touches it. Such spring clamp plate has considerable killing force and is very dangerous even to small children or pets in the house if the spring clamp is not carefully fixed in place and is carelessly touched and actuated by child or pet playing around in the house. Moreover, a rat being caught by the tail or leg might very possibly struggle with all its strength which causes bleeding and even broken tail or leg of the rat, and inevitably causes environmental contamination. Therefore, such spring clamp plate has been gradually given up.

The cage presently adopted to catch rats can generally avoid the above-mentioned shortcomings. However, such cage usually has only one inlet and therefore must be positioned against a wall or wall corner with the inlet facing outward, allowing a rat to enter for the bait. As a result, the application of such cage is largely limited. Besides, such cage is usually less effective because the only one inlet very often alarms the rats.

It is therefore desirable to have a rat catcher which can be freely positioned with less limitation and is more effective in capturing the rats.

SUMMARY OF THE INVENTION

A primary object of the present invention is to provide a rat and wild animal catcher which has improved structure and is safe in use.

Another object of the present invention is to provide a rat and wild animal catcher which has two opposite entrances that can be synchronously actuated to open or close and thereby the rat and wild animal catcher can be positioned at places not necessarily close to a wall corner.

A still further object of the present invention is to provide the above rat and wild animal catcher having two entrances that can effectively reduce the alarm of rats.

BRIEF DESCRIPTION OF THE DRAWINGS

The structural features and performance of the present invention can be best understood through the following detailed description of the preferred embodiment and the accompanying drawings, wherein.

DETAILED DESCRIPTION OF THE PREFERRED EMBODIMENTS

Figure 1:
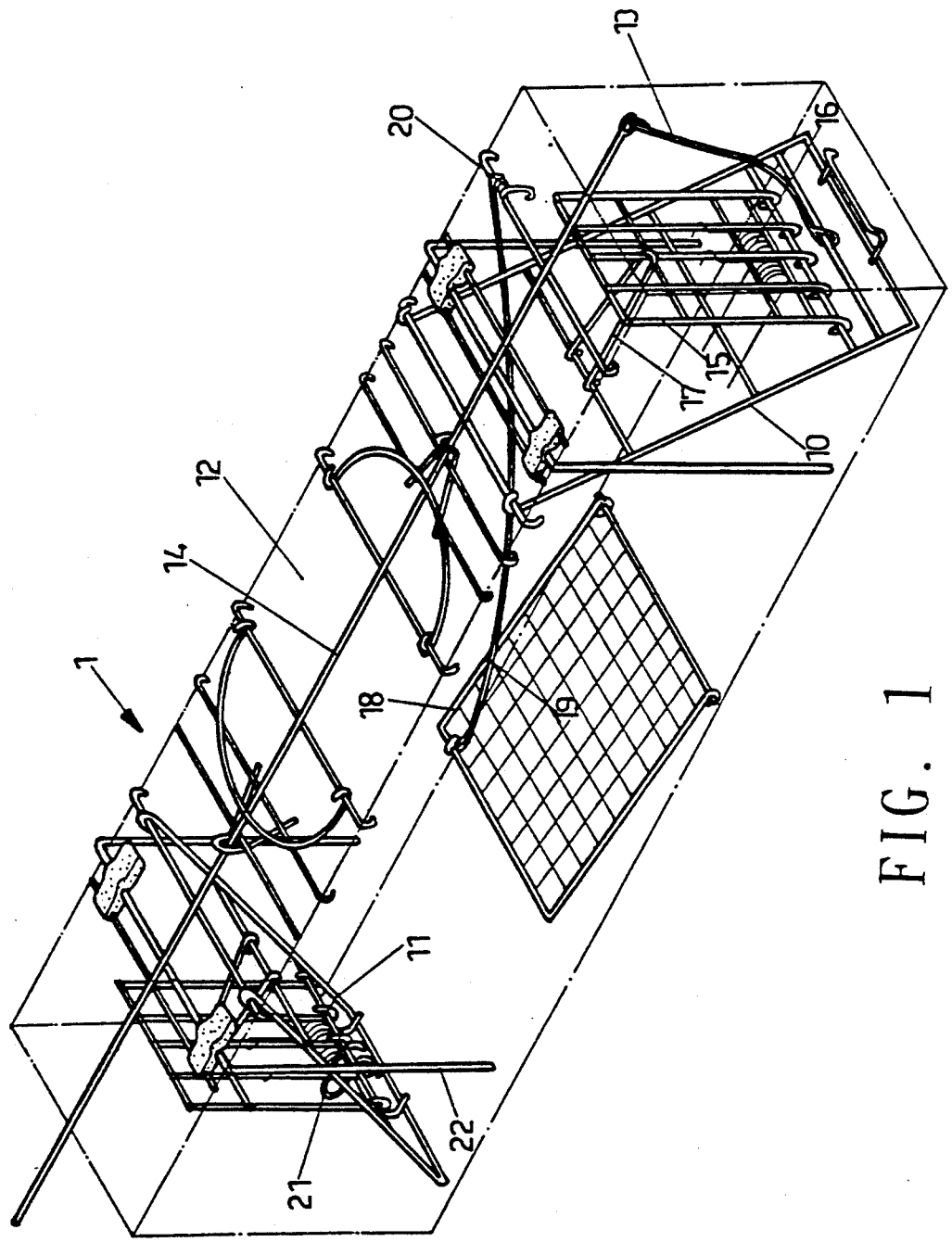
FIG. 1 is a skeleton perspective of the present invention.

Please refer to FIG. 1. The present invention comprises a cage 1 in desired dimensions. The cage 1 has two lateral open ends separately provided with a gate 10, 11 suitable for blocking up the two open ends. The gates 10, 11 each has a top end pivotly connected to a top grid 12 of the cage 1 such that the gates 10, 11 extend downward and outward toward the open end of the cage 1 to form an inclined plane. A cord 13 is connected at one end thereof to one of the gates 10, 11, which is gate 10 in this specification, near a bottom end of the gate 10, and at another end thereof to an actuating rod 14 disposed on the top grid 12 of the cage 1. A press grid 15 is pivotly connected at its lower end to an outer side of each of the gates 10, 11 while its upper end keeps in a movable state. A torsional spring 16 is provided on a lower portion of each press grid 15 between the press grid 15 and the gate 10 or 11 to keep the press grid 15 in a state normally away from the gates 10, 11. A locating member 17 is disposed between each press grip 15 and gates 10, 11 with its one end connected to an upper portion of the press grip 15 and the other end connected to an upper portion of the gate 10, 11 such that the press grips 15 are prevented from being sprung too far away from the gate 10 or 11 and the gates 10, 11 are prevented from moving upward.

A step member 18 is disposed in the cage 1 with its one edge pivotly connected to a bottom grid of the cage 1. A link 19 is connected at one end to a free edge of the step member 18 opposite to the pivotly connected edge thereof and at the other end to a hanger 20 provided near an outer side of the top grid 12 above the gate 10.

Figure 2:
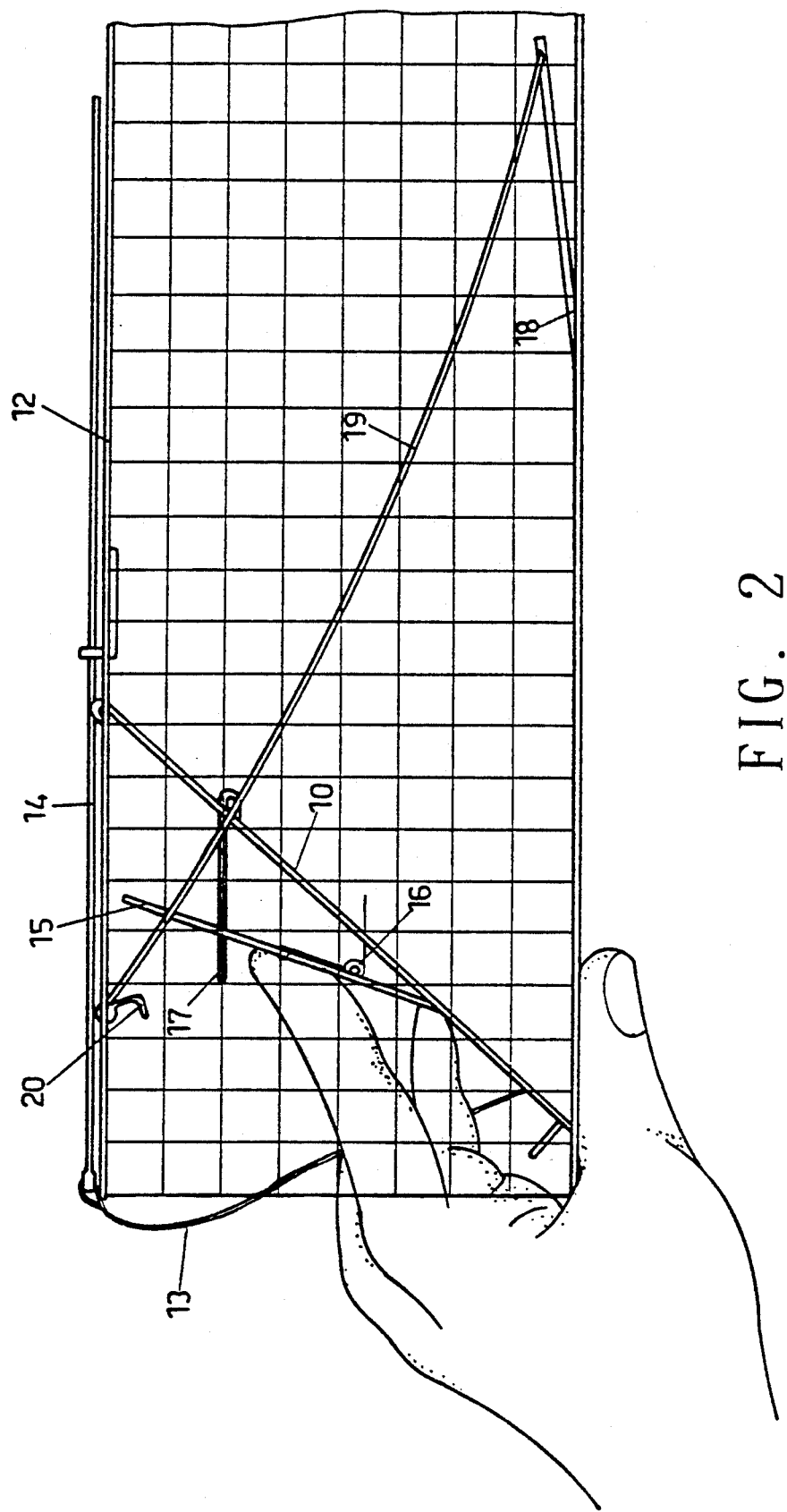
FIG. 2 is a side view showing the press grid of the present invention is pushed toward the gate of the rat and wild animal catcher.
Figure 3:
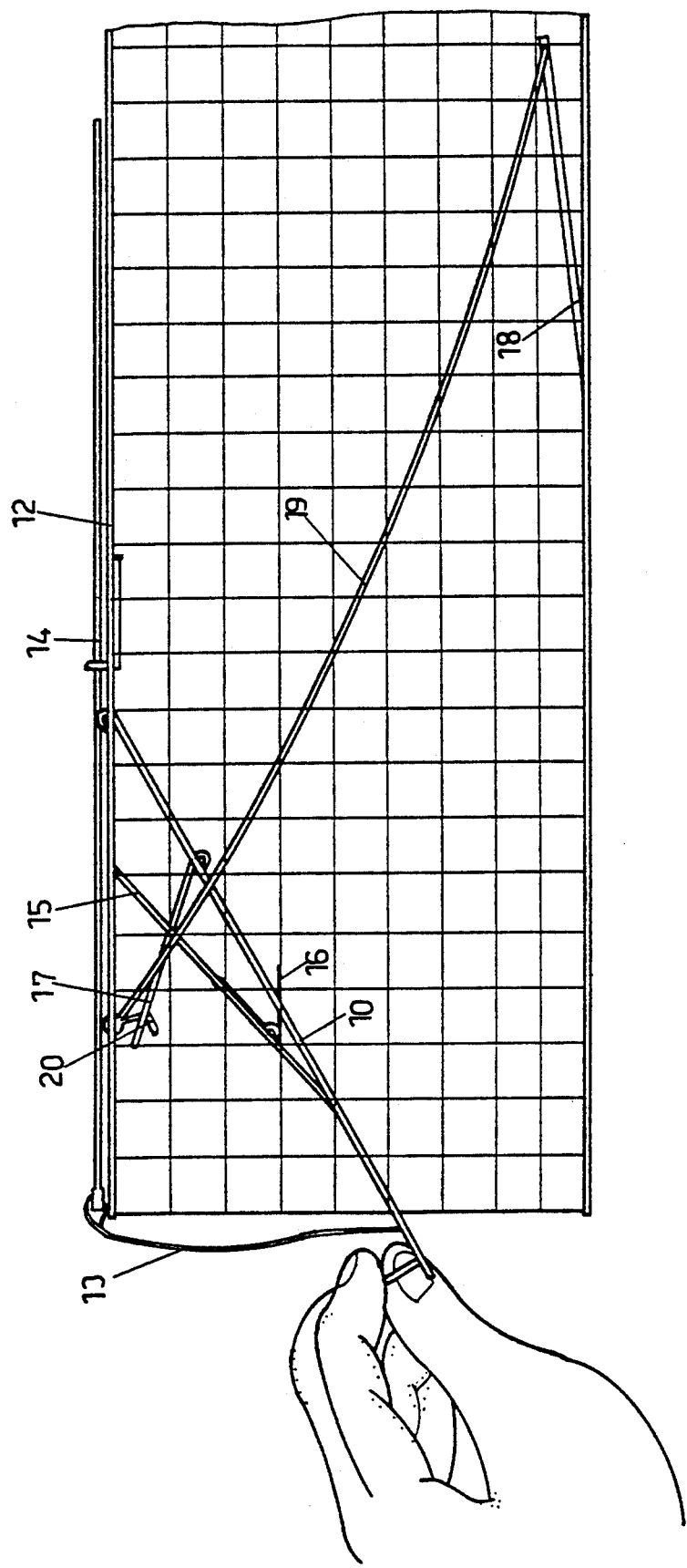
FIG. 3 is a side view showing the closed gate is lifted up toward one open end of the rat and wild animal catcher.
Figure 4:
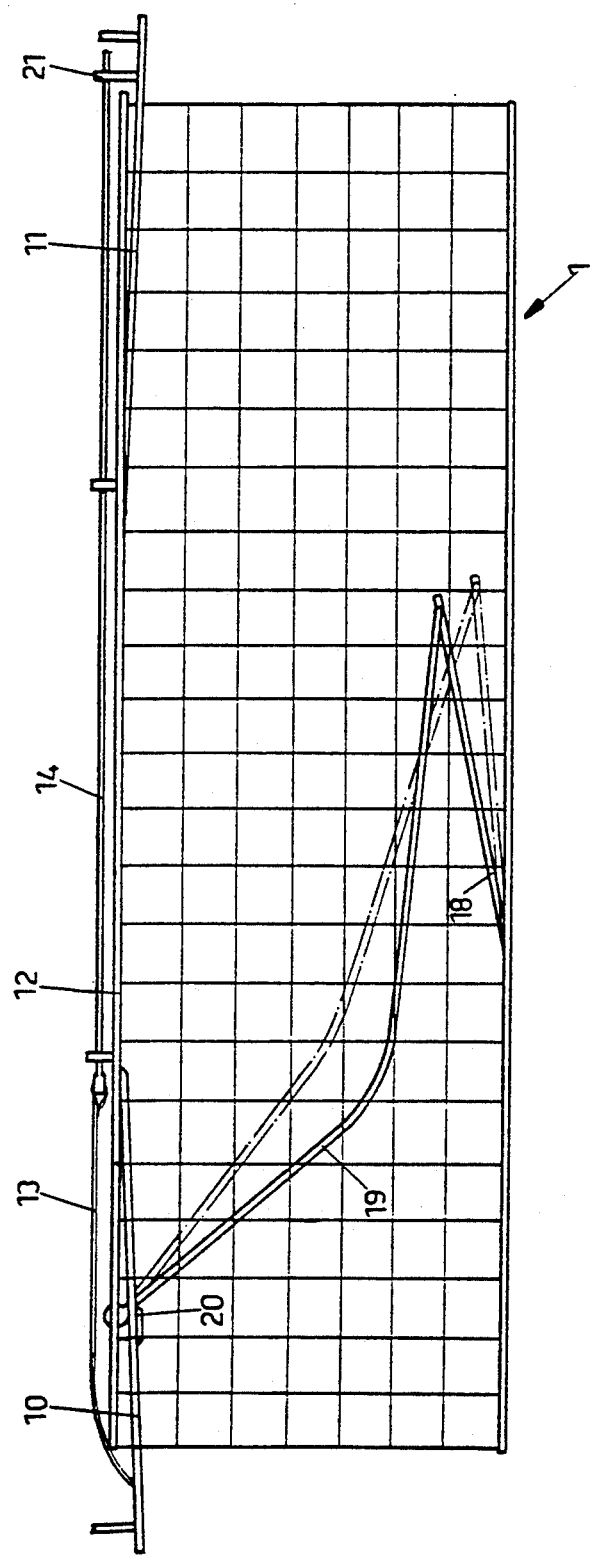
FIG. 4 is a side view showing two ends of the rat and wild animal catcher are opened and ready for catching rats.

Please further refer to FIGS. 2, 3, and 4. When the press grid 15 connected to the gate 10 is pressed against the torsional spring 16, its free upper end inclines toward the gate 10 and separates from the top grid 12. At this point, the gate 10 which originally closes one lateral end of the cage 1 can be lifted up by its lower end to open the lateral end of the cage 1. The up lifted gate 10 can be fixed to the top grid 12 at the hanger 20. When the hanger 20 hooks the gate 10 in place, the link 19 connected to it will be pulled to slightly lift up the step member 18 connected to the other end of the link 19. In the same manner, the other press grid 15 connected to the gate 11 is pressed against the torsional spring 16 thereon so that the gate 11 is also lifted up to open the other lateral end of the cage 1. Allow the actuating rod 14 disposed on the top grid 12 of the cage 1 to extend its free end opposite to the gate 10 into a ring hook 21 provided at a lower portion of the gate 11. At this point, the gates 10, 11, the step member 18, the hanger 20, and the actuating rod 14 become interactive with one another.

Please refer to FIG. 4. The cage 1 is now in a open state with its two lateral gates 10, 11 lifted up. When any rat enters the cage 1 through either the gate 10 or the gate 11 and touches the step member 18, the step member 18 is subjected to a downward force and therefore pulls the link 19 and the hanger 20 connected to the link 19 to move away from the gate 10. The gate 10 released from the hanger 20 keeps moving downward toward the lateral end of the cage 1 to close the same. When the gate 10 moves down to a certain position, the cord 13 connected to its lower portion is forced to draw the actuating rod 14 connected to the other end of the cord 13 to separate from the ring hook 21 on the other gate 11, allowing the two gates 10, 11 of the cage 1 to be released synchronously and the two lateral open ends of the cage 1 are closed at the same time, trapping the rat in the cage 1.

Figure 5:
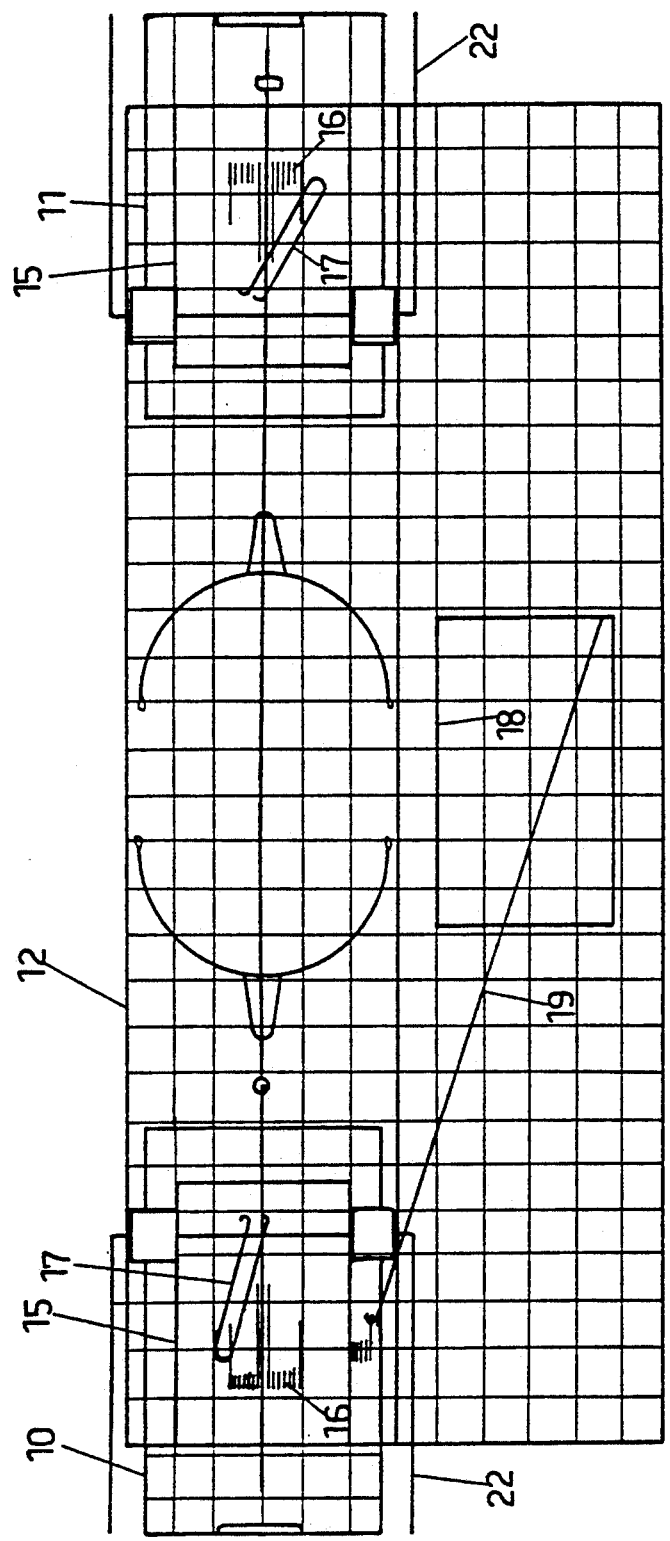
FIG. 5 illustrates a rat and wild animal catcher of the present invention in a folded and collapsed state.

An n-shaped fixing frame 22 is fixed to the top grid 12 near each lateral end of the cage such that two vertical legs of the fixing frame 22 can be swung up and down about a horizontal part of the fixing frame 22 pivotly fixed to the top grid 12. Please refer back to FIG. 1. When the cage 1 is in an open state and ready for catching rats, the two n-shaped fixing frames 22 are swung down with their two legs fitly abutting against two side grids of the cage 1 and thereby reinforce the cage 1. When the cage 1 is not in use, the legs of the fixing frames 22 can be swung upward to separate from the side grids of the cage 1. Then, the press grids 15 are pressed against the torsional springs 16 so that the gates 10, 11 can be lifted up. At this point, the cage 1 is not supported and limited by the gates 10, 11 and therefore can be easily sideward folded and collapsed to a flat state as shown in FIG. 5.

What is claimed is:

1. A rat and wild animal catcher comprising:

a cage having a top grid, two side grids, a bottom grid, and two lateral open ends each disposed with a gate therein to close said open ends in such a manner that said gates each pivotly connects at one upper edge to said top grid with the lower edge outward and downward extends toward said open end of said cage;

two press grids separately pivotly connected at a lower end to a lower portion of each of said gates with a torsional spring disposed thereon between said press grid and said gate to which said press grid is connected such that said press grids are always sprung outward against said gates by said torsional springs, and at an upper end to a fixing member which connects at another end opposite to said press grid to an upper portion of said gate connecting said press grid such that said press grid is restrained by said fixing member from being overly sprung outward by said torsional spring;

an actuating rod disposed on said top grid with two ends thereof separately extending toward said two gates while one of said two ends connects a cord another end of which further connects to a lower portion of said gate next to said cord;

a step member inside said cage and pivotly connected at one edge to said bottom grid; and a link one end thereof being connected to a free edge of said step member opposite to said pivotly connected edge and the other end of said link being connected to a hanger provided on said top grid at an outer portion thereof above said gate having one lower portion connected to said cord;

said catcher being characterized by that said gate having one lower portion connected to said cord can be pivotly lifted up and fixed to said hanger thereabove on said top grid by means of pressing said press grid connected to said gate toward an inner side of said cage, that said other gate can be pivotly lifted up in a similar manner such that it is fixed in place by said actuating rod disposed on said top grid when said actuating rod extends through a ring hook provided on a lower portion of said other gate, that said step member, when being subjected to a downward force, pulls said link and accordingly said hanger to release said gate being fixed thereto, and said gate, when being released from said hanger and moving downward to a certain position, pulls said cord downward so that said cord further pulls said actuating rod to separate from said ring hook of said another gate, causing said two gates to simultaneously move down and close said two open ends of said cage.

2. A rat and wild animal catcher as claimed in claim 1, wherein said catcher further has two n-shaped frames separately fixed to said top grid near each lateral end of said cage such that two vertical legs of each of said fixing frame can be swung up and down about a horizontal part of said fixing frame pivotly fixed to said top grid; and said two vertical legs of each said fixing frame can be swung down to fitly abut against said two side grids of said cage to reinforce said cage when said catcher is ready for use or be swung up to separate from said two side grids of said cage when said catcher is not in use and said two gates are lifted up and fixed to said top grid so that said catcher can be sideward folded and collapsed to a flat state.

* * * * *